Nov. 4, 1941.     C. S. ASH     2,261,637
RIM MOUNTING FOR DUAL WHEELS
Filed April 4, 1939     2 Sheets-Sheet 1

INVENTOR
Charles S. Ash
BY
Morgan, Finnegan and Durham
ATTORNEYS

Nov. 4, 1941.                C. S. ASH                2,261,637
                    RIM MOUNTING FOR DUAL WHEELS
                       Filed April 4, 1939           2 Sheets-Sheet 2
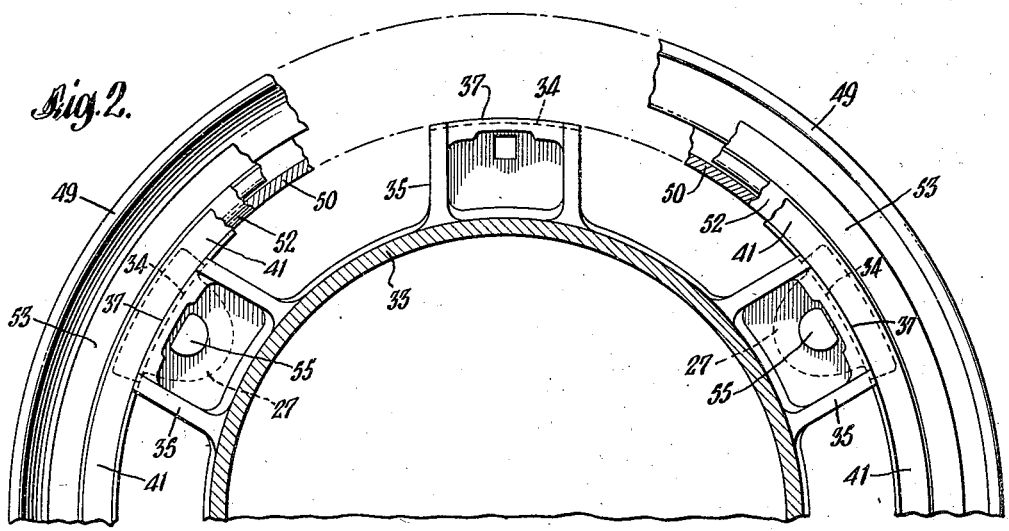
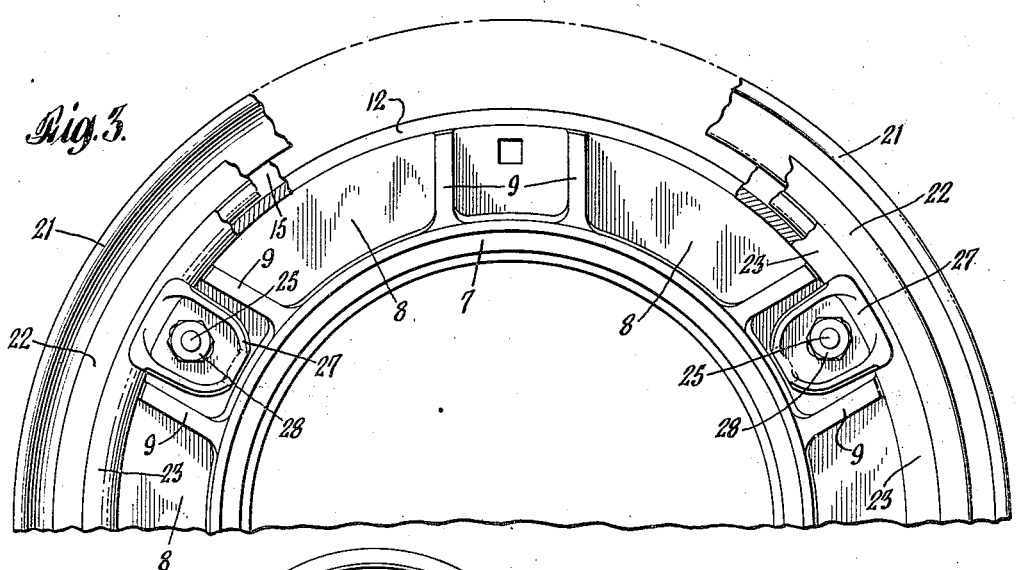
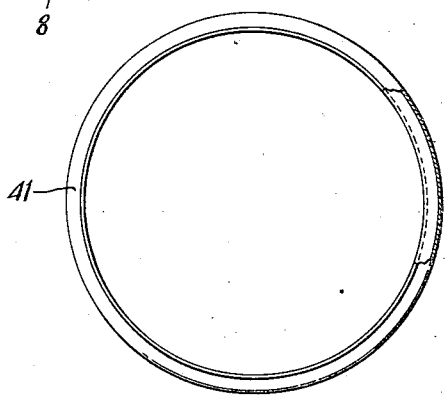

Patented Nov. 4, 1941

2,261,637

UNITED STATES PATENT OFFICE 2,261,637

RIM MOUNTING FOR DUAL WHEELS

Charles S. Ash, Milford, Mich.

Application April 4, 1939, Serial No. 265,880

1 Claim. (Cl. 301—12)

The invention relates to new and useful improvements in vehicle wheels, and especially to such wheels designed for heavy duty, the invention relating more particularly to such improvements in the wheel structure which mount and support the wheel rim.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 2 is a view, partly in elevation and partly in section, on line 2—2 of Fig. 1;

Fig. 3 is a view, partly in elevation and partly in section, on line 3—3 of Fig. 1; and Fig. 4 is a detail, on a reduced scale, of the stop ring of the rim mounting.

Figure 1:
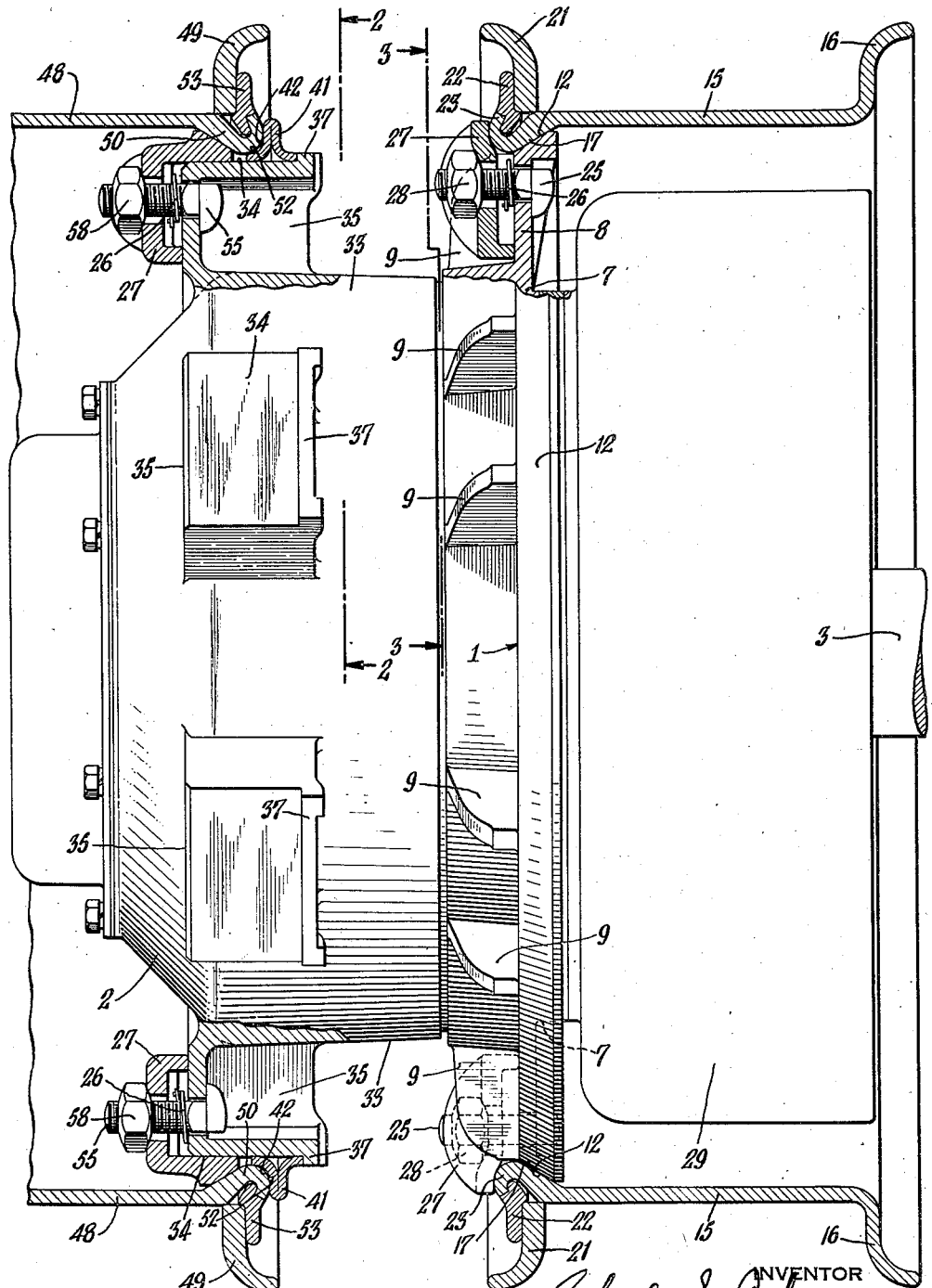
Fig. 1 is an elevation of a dual wheel assembly embodying the invention.

Objects of the invention are to provide a novel and useful wheel structure of the demountable wheel type which affords a very sturdy and relatively light-weight wheel construction, while affording an unusually firm and fixed seating for the rim, especially adapted and capacitated for heavy duty, as in trucks, trailers, and the like; to provide a dual wheel assembly structure having the characteristics described and having rim mounting and holding means which permit and facilitate easy, simple and rapid removal and remounting of rims and tires; to provide different forms of rim mounting means on the inboard and outboard wheels which cooperate to permit simple and easy removal of rims and tires, while at the same time providing simple, sturdy and reliable support for the rims, these forms of mounting also being usable or available apart from each other for use with single wheels or otherwise. With these and other objects and advantages in view, an inboard wheel is provided with a preferably continuous disc body, and having a peripheral outwardly-beveled face adapted to engage with a correspondingly beveled inwardly-extending annular portion formed along the outer circular edge of the rim, means being provided for firmly clamping the wheel and rim together along these beveled surfaces. The outboard wheel has a cylindrical periphery, either continuous or discontinuous, of somewhat lesser diameter than said disc and beveled peripheral face of the inboard wheel. A separate rim-engaging ring is laterally slidable onto and fits tightly about the cylindrical periphery of the outboard wheel and its inner edge abuts against stops which axially position it. This ring has an outwardly-inclined, arcuate bevel face adapted to engage with a correspondingly beveled, inwardly-extending annular portion formed along the inner circular edge of the rim, means being provided for firmly clamping the wheel and rim together along these beveled surfaces. Thus, by removing the outboard rim, and sliding the bevel ring axially off the periphery of the outboard wheel, the rim of the inboard wheel may be withdrawn over the outboard wheel very simply, directly and expeditiously, and replaced in the same manner. It will be understood that the foregoing general description and the following detail description as well are exemplary and explanatory but are not restrictive of the invention.

Referring now in detail to the embodiment of the invention illustrated by way of example in the accompanying drawings, a dual wheel assembly is shown comprising an inboard wheel I and an outboard wheel 2, rotatably mounted side by side on an axle 3. The inboard wheel I is shown with a hub 7 and integral therewith a wheel body in the form of a flat disc 8, there being reinforcing webs 9 integral with both the hub and the body disc. The rim-mounting means comprises a peripheral, outwardly-inclined rim-engaging surface 12 formed along the outer face of the periphery of the wheel disc. The rim 15 has along its inner circular edge an outwardly-extending tire-engaging flange 16 which may be of usual form. The rim 15 along its outer circular edge has an inwardly-extending annular part, that is, a part of lesser diameter, having a beveled surface 17 adapted to engage with and fit against the beveled surface 12 of the wheel disc when the rim is moved laterally into position. An annular, detachable tire-engaging flange 21, which may be of usual form, is passed into position along the outer edge of the rim, and a split retaining ring 22, which also may be of known form, is sprung into an annular recess formed by an outer turned-up lip 23 of the rim 15. Suitable clamping devices are provided for holding the rim to the wheel, and as shown hook bolts 25 are positioned in apertures in the wheel disc 8, being held in position by their hooks and by a wire loop 26 passing around the bolt. Clamps 27 are passed over the bolts, and nuts 28 hold the clamps in position. A suitable brake drum 29 is usually integral with the wheel body.

The outboard wheel comprises a hub 33 and a cylindrical periphery 34 which, when the wheel is used in the dual assembly, is of less diameter than the periphery of the disc of the inboard wheel, that is of less diameter than the outer diameter of the bevel face 12. This cylindrical periphery 34 of the outboard wheel may be either continuous or discontinuous as desired, and is here shown as being formed on the ends of spokes 35 extending outwardly from the hub 33. This cylindrical peripheral portion terminates at its inner end in an annular radially-projecting flange 37, which acts as a stop for a removable rim-engaging bevel ring which is slipped into position over the cylindrical periphery 34, as later described. A rim-engaging ring 41, which may be and preferably is integral, is slidable laterally onto the cylindrical periphery 34, fitting snugly thereover, and is accurately positioned by abutting on the stop flange 37. The ring 41 has on its exterior side a beveled or curved rim-engaging face 42, and may be formed of symmetrical or duplicate cross section, as shown in Fig. 1. A rim 48 has an inner tire-retaining flange 49. The rim has along its inner circular edge an inwardly-extending annular part 50, that is, a part of lesser diameter, having a beveled surface 52 adapted to engage with the beveled or arcuate surface 42 of the ring 41. A split ring 53 is sprung into the annular recess formed on the exterior of the part 50 of the rim and serves to hold the flange 49 in position. Suitable clamping devices are provided for holding the rim 48 to the wheel, and as shown hook bolts 55 are positioned in apertures in the spokes 35, being held in position by their hooks and by wire loops passing around the bolt. Clamps 27 are passed on to the bolts and nuts 58 hold the clamps in position.

The invention in its broader aspects is not limited to the specific mechanisms shown and described but departures may be made therefrom within the scope of the accompanying claim without departing from the principles of the invention and without sacrificing its chief advantages.

What I claim is:

A rim mounting for an outer wheel of the type used in dual wheel assemblies, in which the outer wheel is of a smaller diameter than the inner diameter of the rim of the inner wheel, whereby clearance of the inner rim over the outer wheel is permitted, comprising an outer wheel having an outer cylindrical seating surface terminating at the inner edge in a radial abutment flange, a beveled rim engaging continuous ring of an inner diameter to freely slide along said seating surface from the outside of the wheel to abut against said flange and be positioned thereby, an outwardly extending rim having a compound beveled part near its inner edge, one portion of said beveled part contacting said continuous ring for a wedging engagement therewith, and lugs for fastening said outer rim to said wheel, said clamping lugs having an inwardly extending beveled face engaging another portion of said beveled part of said rim to wedgingly force the rim against said continuous ring and securely clamp the rim on the outer wheel.

CHARLES S. ASH.